Nov. 11, 1924.

C. F. KETTERING

HYDROMETER

Filed Aug. 10, 1918

1,514,970

Witnesses

Inventor
Charles F. Kettering
Kerr, Page, Cooper and Hayward
Attorneys

Patented Nov. 11, 1924.

1,514,970

UNITED STATES PATENT OFFICE.

CHARLES F. KETTERING, OF DAYTON, OHIO, ASSIGNOR, BY MESNE ASSIGNMENTS, TO DELCO-LIGHT COMPANY, OF DAYTON, OHIO, A CORPORATION OF DELAWARE.

HYDROMETER.

Application filed August 10, 1918. Serial No. 249,220.

*To all whom it may concern:*

Be it known that I, CHARLES F. KETTERING, a citizen of the United States of America, residing at Dayton, county of Montgomery, State of Ohio, have invented certain new and useful Improvements in Hydrometers, of which the following is a full, clear, and exact description.

The present invention relates to improvements in hydrometers and particularly to that class of hydrometers which are permanently installed in secondary batteries for the purpose of indicating the degree of charge thereof.

One of the objects of the invention is to provide improvements in the manner of supporting the hydrometer within the battery, so that the hydrometer may be permanently located therein with ease and accuracy.

Another object of the present invention is to provide a hydrometer of simple construction and which can be readily removed for repair or replacement.

Other and further objects and advantages of the present invention will be apparent from the following description, reference being had to the accompanying drawings wherein an embodiment of the present invention is clearly illustrated.

Figure 1:
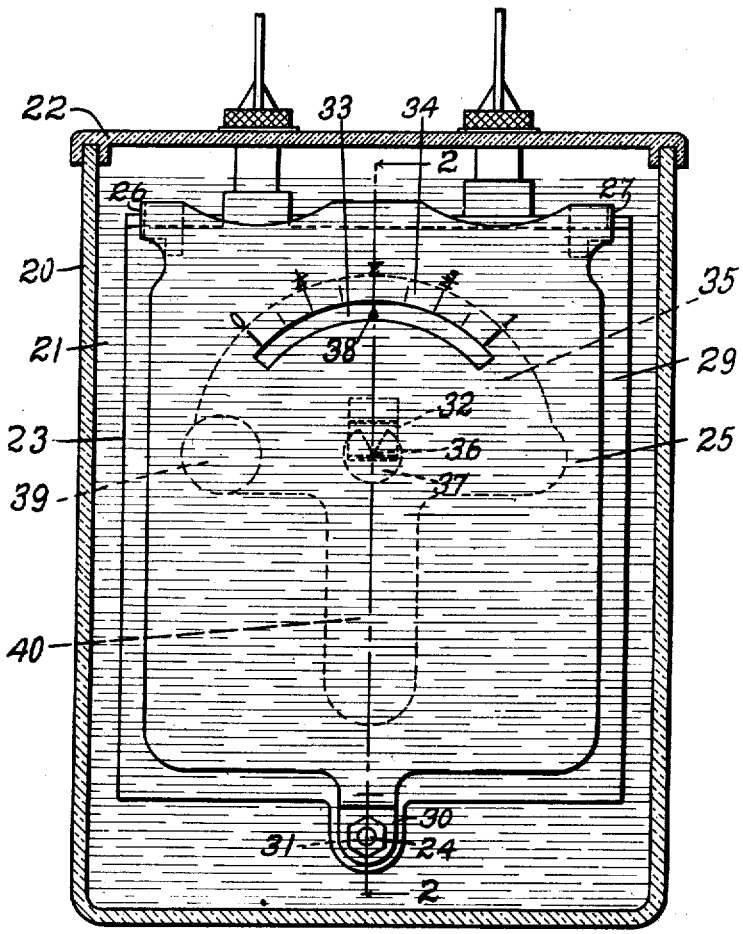
Fig. 1 is a front elevation of a hydrometer and a side view of a plate assembly with the hydrometer mounted thereon, the battery cell being shown in section.

Referring to the drawing, the numeral 20 indicates a glass battery cell, 21 the electrolyte therein, and 22 a cover for said cell. A plate assembly consisting of a set of battery plates 23, insulated from each other, the positive and negative plates being connected to suitable terminals, is mounted upon the cover of the battery cell and the plates are held together by means of a bolt 24 or other suitable fastening means.

Figure 2:
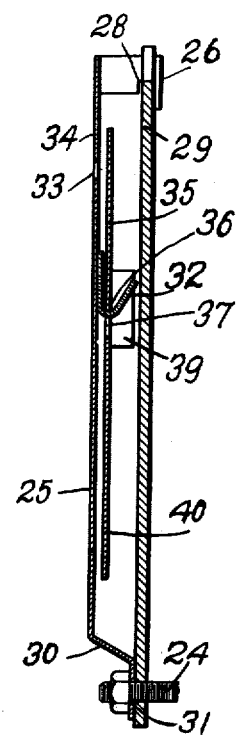
Fig. 2 is a sectional view taken on the line 2—2 of Fig. 1.

A stationary element 25 is provided at the upper edges thereof with outwardly projecting ears 26 and 27, provided with notches 28 which are adapted to cooperate with the battery plate 29 as shown in Fig. 2. On the bottom portion of the stationary element 25 a downwardly projecting ear 30 is provided having a hole 31 through which the bolt 24 passes, thereby securing the stationary element on the battery plate 29. A ledge 32 is secured to the stationary element for a purpose to be described. The stationary element 25 is provided with an arcuate slot 33 and a scale 34 is placed on the element 25 adjacent the slot.

A fan shaped movable element 35 is pivotally mounted on the ledge 32, by means of a knife edge bearing 36, formed by cutting away a portion of the element 35, adjacent the center thereof as can be seen at 37. Said movable element is provided with an index 38 such as an arrow head located adjacent the arcuate slot 33. The movable element carries a displacement member 39, of rubber or other suitable material, which is constructed and arranged in a manner such that the depth to which the displacement member is submerged in the electrolyte depends on the density thereof.

A counter-weight 40 is provided at the bottom of the movable element 35, which, as the element tends to move in its axial movement, due to the influence of the displacement member 39, will tend to place the center of gravity of the entire movable element below the pivot point of the knife edge bearing 36.

The operation of the present form of my invention is as follows: Assuming that the battery is in a one-half charged condition the depth to which the displacement member 39 is submerged in the electrolyte will correspond with the density of the electrolyte; therefore, when the battery is in a half charged condition, the index 38 adjacent the arcuate slot, will indicate one half charge as shown in Fig. 1. Should the battery cell be further charged above its half way point, the specific gravity of the electrolyte will then increase, the displacement member will rise or if the cell is being discharged the specific gravity of the electrolyte will decrease and permit the displacement member to sink. The movements thus imparted to the displacement member corresponding to changes in specific gravity of the electrolyte will be transmitted to the movable member 35, and the index 38 will indicate the degree of charge corresponding to the specific gravity.

It will be apparent from the foregoing description that the hydrometer herein described has advantages over hydrometers that are not attached to the battery plate. One of the advantages is the ease of installation and the possibility of quick removal in case of repair or replacement. By removing the nut from the bolt used for holding the battery plates together, the hydrometer can easily be slipped off or said bolt and the outwardly projecting ears of said hydrometer can then be lifted from the battery plate, thereby releasing the hydrometer.

The improved support for the movable hydrometer element makes it possible to quickly install the instrument in a given number of cells with the same degree of accuracy. In the manufacture of the hydrometer, the scale is calibrated with displacement members immersed at a certain depth. Therefore, it is necessary to locate the ledge accurately with respect to the level of the electrolyte usually existing when the battery is properly cared for, and to make the location of the ledge uniform for all cells of a given size. In the care of a cell it is customary to keep the level of the electrolyte at a certain distance above the top edges of plates. This being true, where the hydrometer is mounted on the battery plates, and the ledge is therefore located at a certain distance from the top edge of the plate, and this distance is uniform for all plates of a given size, then it follows that the hydrometer will be accurately and uniformly located in all the cells of a battery with respect to the level of the electrolyte. Thus if all the cells of a battery receive proper attention, the hydrometer will register with uniform accuracy in all the cells.

By constructing the support 25 of opaque material, such as white celluloid, and arranging the support so as to conceal the movable element 35, except where the index 38 may be viewed through the slot 33. I have produced a hydrometer which is very easy to read, because the only parts which are presented to the view of the attendant are the scale and index, which are usually printed or otherwise placed on in black, and the white back-ground of the support. The slot and movable element are so arranged relative to each other so that, for all hydrometer readings, a portion of the movable element, which is also generally constructed of white celluloid will always be opposite the slot and will obstruct the view through the slot of the battery plates. Thus the attention of the attendant is confined wholly to the scale and index and is not distracted by any of the other parts of the hydrometer, or any of the parts of the battery cell. This advantage is of considerable importance where a large number of cells are cared for by a single attendant.

While the form of mechanism herein shown and described, constitutes a preferred embodiment of one form of the invention, it is to be understood that other forms might be adopted and various changes and alterations made in the shape, size, and proportion of the elements therein without departing from the spirit and scope of the invention.

What I claim is as follows:

1. In a hydrometer for storage batteries and the like, comprising a movable element; and a support for the movable element having provisions whereby the support may be secured to one of the battery plates, said support member having an arcuate slot and being provided with a scale, the movable member having an index adjacent the slot.

2. In a hydrometer for storage batteries and the like, comprising a movable element having a knife-edged bearing; and a support for the movable element having provisions whereby the support may be suspended from the upper edge of a battery plate, the support member having a ledge to support the knife-edged bearing of the movable element, said support and movable element being provided with cooperating scale and index means.

3. In a hydrometer for storage batteries and the like, comprising a movable element; and a support for the movable element having provisions whereby said support may be mounted upon the peripheral edge portion of a battery plate, said support and movable element being provided with cooperating scale and index means.

4. A hydrometer comprising a stationary member; a cooperating movable member carried thereby at one side thereof; supporting means projecting from said stationary member to the same side as the movable member, whereby said stationary member may be secured to a supporting object with the movable member between them.

5. In a unitary device of the character described, the combination, with a plate assembly comprising a plurality of battery plates; of means for fastening said plates together; a hydrometer having cooperating relatively stationary and movable members; and means cooperating with said fastening means for securing said stationary member to said plate assembly.

6. A hydrometer having movable and stationary members; supporting means for the stationary member including a hook member extending outwardly therefrom whereby said stationary member may be suspended from a convenient object; and means adjacent the lower edge of said stationary member for spacing the same from the supporting object.

7. A hydrometer having movable and stationary members; and supporting means for the stationary member including a hook member extending outwardly therefrom whereby said stationary member may be suspended from a convenient object.

8. A hydrometer having movable and stationary members; and supporting means for the stationary member including ears projecting outwardly therefrom and adapted for attachment to a convenient object.

In testimony whereof I affix my signature.

CHARLES F. KETTERING.

Witnesses:
J. W. McDonald,
M. A. Peare.

Certificate of Correction.

It is hereby certified that in Letters Patent No. 1,514,970, granted November 11, 1924, upon the application of Charles F. Kettering, of Dayton, Ohio, for an improvement in "Hydrometers," errors appear in the printed specification requiring correction as follows: Page 2, lines 76, 84, and 95, claims 1, 2, and 3, for the words "In a" read *A;* same page and claims, lines 76, 85, and 96, after the word "like" and before the comma insert the words *having battery plates;* and that the said Letters Patent should be read with these corrections therein that the same may conform to the record of the case in the Patent Office.

Signed and sealed this 17th day of February, A. D. 1925.

[SEAL.]
KARL FENNING,
*Acting Commissioner of Patents.*